(12) United States Patent
Luotojärvi et al.

(10) Patent No.: US 11,463,414 B2
(45) Date of Patent: Oct. 4, 2022

(54) SECURE REMOTE CONNECTIONS IN INDUSTRIAL INTERNET OF THINGS

(71) Applicant: ABB Schweiz AG, Baden (CH)

(72) Inventors: Mika Luotojärvi, Helsinki (FI); Riku Hyttinen, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/593,887

(22) PCT Filed: Mar. 27, 2020

(86) PCT No.: PCT/EP2020/058795
§ 371 (c)(1),
(2) Date: Sep. 27, 2021

(87) PCT Pub. No.: WO2020/201128
PCT Pub. Date: Oct. 8, 2020

(65) Prior Publication Data
US 2022/0103517 A1    Mar. 31, 2022

(30) Foreign Application Priority Data

Mar. 29, 2019   (EP) ..................................... 19166073

(51) Int. Cl.
*H04L 9/40* (2022.01)
(52) U.S. Cl.
CPC ........ *H04L 63/029* (2013.01); *H04L 63/0807* (2013.01); *H04L 63/0853* (2013.01); *H04L 63/0876* (2013.01); *H04L 63/20* (2013.01)
(58) Field of Classification Search
CPC  H04L 63/029; H04L 63/0807; H04L 63/0853
See application file for complete search history.

(56) References Cited

U.S. PATENT DOCUMENTS

| | | | | |
|---|---|---|---|---|
| 8,656,154 B1* | 2/2014 | Kailash | ............... | H04L 63/0807 713/168 |
| 9,166,975 B2* | 10/2015 | Kuang | ................ | H04L 63/0838 |
| 2015/0188949 A1* | 7/2015 | Mahaffey | .............. | H04W 12/37 726/1 |

FOREIGN PATENT DOCUMENTS

EP          2660667 A2     11/2013

OTHER PUBLICATIONS

Extended European Search Report; Application No. 19166073.7; Completed: Jun. 27, 2019; dated Jul. 8, 2019; 7 Pages.

(Continued)

*Primary Examiner* — Khoi V Le
(74) *Attorney, Agent, or Firm* — Whitmyer IP Group LLC

(57) ABSTRACT

A method for establishing a secure remote connection between a user device and a target device, wherein the target device has no direct internet connectivity. A first gateway receives a first connection request from the user device, the first connection request including an access token. The access token is validated in an identity and access management service, and, after successful validation, a first tunnel is established between the user device and the target device via one or more intermediate gateways. The target device receives a second connection request from the user device, the second connection request including the access token. A second tunnel is established between the target device and an identity and access management service via the one or more intermediate gateways, and the access token is validated in the identity and access management service via the second tunnel.

13 Claims, 5 Drawing Sheets

(56) References Cited

OTHER PUBLICATIONS

International Search Report and Written Opinion of the International Searching Authority; Application No. PCT/EP2020/058795; Completed: Apr. 29, 2020; dated May 5, 2020; 9 Pages.

* cited by examiner

SECURE REMOTE CONNECTIONS IN INDUSTRIAL INTERNET OF THINGS

TECHNICAL FIELD

The present invention relates to remote connections in the Industrial Internet of Things.

BACKGROUND

The Internet of Things (IoT) is the networking of physical devices (also referred to as "connected devices" and "smart devices"), such as vehicles, home appliances, machines, computers and other items that are embedded with electronics, software, sensors, actuators, and network connectivity that enable these objects to collect and exchange data. IoT allows objects to be sensed and/or controlled remotely across existing network infrastructure. The Industrial Internet of Things (IIoT) is the use of IoT technologies in the manufacturing industry. It incorporates machine learning and big data technology, harnessing the sensor data, machine-to-machine communication and automation technologies that have existed in industrial settings for years. IIoT also provides mechanisms to connect industrial devices to a cloud computing platform and to transfer information to the cloud platform for performing various operations, such as analytics or data mining on the industrial data. It is obvious from the above that a huge amount of data is collected in the IIoT area, and it is also obvious that not every user of the system should be allowed to see each and every data item in the system. Since a cloud computing platform by its nature includes data from a large user base, the presence of access controls is vital to the protection of sensitive industrial data. Further, since a cloud computing platform is envisaged as a central repository of data potentially belonging to different stakeholders with different requirements on controlling the access, the ability of providing controlled access to data collected through the entire lifetime of systems and devices is an important requirement within IIoT.

In IIoT, the data source may be some industrial device, such as a robot, a motor, or a drive. If IIoT solutions are built on top of existing automation and monitoring systems, or otherwise connecting old devices, it may be required that the IIoT solutions support possibly unsecure legacy protocols and technologies, such as SCADA protocols. This results in a hierarchical overall system structure containing multiple different security zones or system levels, which are targeted for varying types of use in the same factory. As there are multiple legacy systems and protocols still in use, many of these are not designed with current security principles in mind, and the network may be isolated as separate security zones with limited external connectivity. In order to update software, analyze problems, manage configuration parameters, or monitor the operation of an industrial device, there is often a need for a user, for example a service technician, to connect to the industrial device remotely over the Internet. However, due to security reasons, industrial devices in legacy systems are not allowed to accept connections directly from the Internet, and typically only secure outgoing connections are allowed from them. In this case, the industrial device itself is not connected to any internet-facing device, but instead to a local on-premise gateway or edge computing device. This gateway might again be connected to another on-premise gateway at an upper system level, and so on, until finally the highest-level on-premise gateway is then connected to the Internet.

Traditional remote-access methods, such as virtual private networking (VPN) and remote desktop connection (RDC), lack the flexibility and intelligence to meet the needs of today's industrial organizations due to time-consuming and complex setup, as well as security concerns. Therefore, there is a need to improve the security and usability of existing mechanisms for establishing remote connections to industrial devices.

SUMMARY

An object of the present invention is to provide a mechanism for establishing a secure remote connection between a user device and a target device. The object of the invention is achieved by a method, a computer program product, equipment and a system, which are characterized by what is stated in the independent claims. The preferred embodiments of the invention are disclosed in the dependent claims.

According to an aspect of the invention, there is provided a computer-implemented method comprising: receiving, by a first gateway a first connection request from a user device, said first connection request comprising an access token; validating the access token in an identity and access management service; after successful validation, establishing a first tunnel between the user device and a target device via a chain of trusted certificate-based point-to-point connections through one or more intermediate gateways, wherein the first tunnel is established by using a reverse connection from the first gateway to the target device, said reverse connection being based on a pre-established connection from the target device to the first gateway via an outbound port in the target device and in each of the one or more intermediate gateways in the chain, said target device having no direct internet protocol connectivity to the user device without the first tunnel; receiving, by the target device, a second connection request from the user device via the first tunnel, said second connection request comprising the access token; establishing a second tunnel between the target device and the IAM service via the chain of trusted certificate-based point-to-point connections through the one or more intermediate gateways, wherein the second tunnel is established by using the reverse connection from the first gateway to the target device, said target device having no direct internet protocol connectivity to the IAM service without the second tunnel; and validating the access token in the IAM service via the second tunnel.

BRIEF DESCRIPTION OF THE DRAWINGS

In the following, exemplary embodiments will be described in greater detail with reference to accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention may be applicable to any system implementing central management and edge computing to data collected by Industrial Internet of Things, or a corresponding industrial system generating data. Different embodiments and examples are described below without restricting the embodiments/examples to such a solution. Concepts called cloud computing and/or virtualization may be used. The virtualization may allow a single physical computing device to host one or more instances of virtual machines that appear and operate as independent computing devices so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN), may cause one or more of the below described functionalities to be migrated to any corresponding abstraction or apparatus or device. Therefore, all words and expressions should be interpreted broadly and they are intended to illustrate, not to restrict, the embodiment.

Figure 1:
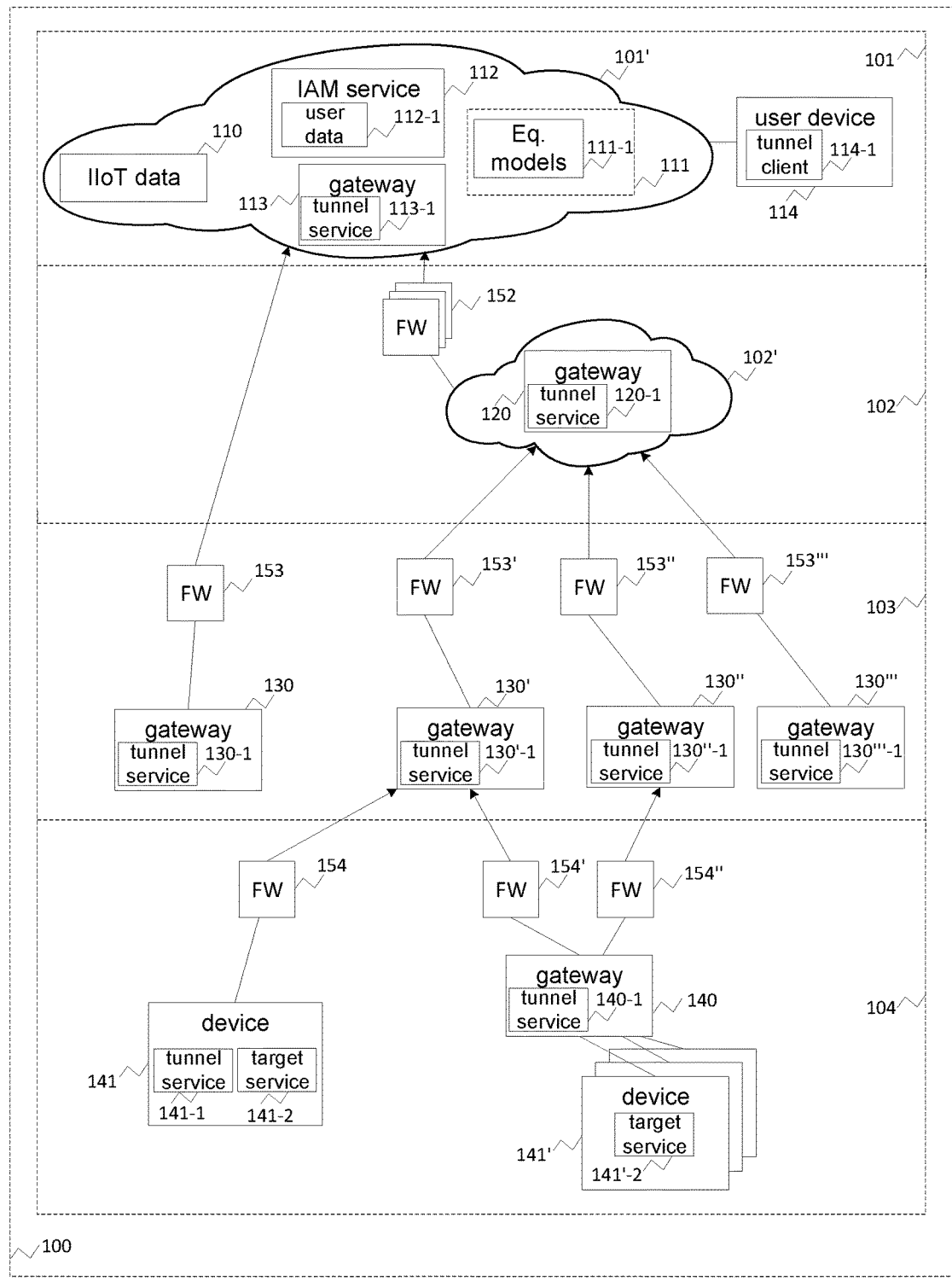
FIG. 1 shows a simplified architecture of a system.

A general exemplary architecture of a system is illustrated in FIG. 1. FIG. 1 is a simplified system architecture only showing some equipment (apparatuses, devices, nodes) and functional entities, all being logical units whose implementation and/or number may differ from what is shown. The connections shown in FIG. 1 are logical connections; the actual physical connections may be different. Data collection may use so-called master protocols (a master is also known as a protocol client), in which a network node subscribes data from slaves (devices whose data it wants to have) and/or slave protocols (a slave is also known as a protocol server), in which a device/network node sends its data to the receiver based on query or automatically based on subscription. It is apparent to a person skilled in the art that the systems may also comprise other nodes (apparatuses, devices), functions and structures used in or for Industrial Internet of Things, big data, virtualization, data management, and communication in the system or in one part of the system. They, as well as protocols used, are well known by persons skilled in the art and are irrelevant to the actual invention. Therefore, they do not need to be discussed in more detail here.

In the following embodiments, a concept called an equipment model is used as an example of an information model without restricting the embodiments to the equipment model. It is obvious to one skilled in the art how to implement the disclosed principles when other information models, such as information models relating to production transactions, are used.

The architecture may be based on an edge computing model in which data from Things may be processed by a nearby edge computing device, which may also be referred to as a gateway herein.

In the embodiment illustrated in FIG. 1, the system 100 comprises four different hierarchical levels: a global cloud level 101 forming a level for central management, one or more enterprise levels 102 (only one depicted in FIG. 1), one or more plant levels 103 (only one depicted in FIG. 1) and one or more device levels 104 (only one depicted in FIG. 1), which depicts a level for different "Things". It should be appreciated that any other level structure and/or hierarchy may be used between the device level 104 and the global cloud level 101.

The global cloud level 101 comprises a global cloud 101' that comprises data 110 (IIoT data) originating from the Things. The data 110 may comprise raw data and/or analysis data. Further, the global cloud 101' may comprise a global equipment model repository 111, which comprises a plurality of equipment models 111-1.

The global cloud 101' may also comprise a server 112 executing an identity and access management service unit, herein referred to as IAM service. Typically, there may be a vast number of users in an IIoT system, but not every user should be allowed to access all of the devices or data in the system. To address this problem, the IAM service 112, which can be based for example on OAuth 2.0, provides means to store user-specific data 112-1, which may comprise data for example on the role(s) (for example a system administrator, service technician, operator, plant manager, etc.) of each user in an organization/enterprise. Communication with the IAM service 112 may be based on Lightweight Directory Access Protocol (LDAP), for example. The IAM service 112 may also be configured to provide access tokens to authenticated users. These access tokens, based for example on Security Assertion Markup Language (SAML), may comprise authentication and authorization data for a user in order to exchange this data between parties in the system 100. Access rights verification procedures may be defined in separate security structures, as is known for one skilled in the art, and hence not described in detail herein. It should also be appreciated that the IAM service 112 may alternatively be located on the enterprise level 102, for example.

Furthermore, the global cloud 101' may comprise a gateway 113, which may comprise a tunnel service unit 113-1, herein referred to as tunnel service. The tunnel service may provide functionalities for establishing end-to-end tunnels between user devices 114 and devices 141, 141' on the device level 104, for example. In other words, an authorized user may connect to the tunnel service for establishing an internet protocol (IP) tunnel to a target service 141-2, 141'-2 in a target device 141, 141'. The tunnel may use the transmission control protocol (TCP), and thus be a TCP/IP tunnel. However, the user datagram protocol (UDP) may be used as an alternative to TCP, for example. The TCP/IP tunnel may be relayed via the intermediate tunnel services 120-1, 130'-1 between the cloud-level tunnel service 113-1 and the target service 141-2, 141'-2. The process for establishing the tunnels will be described later in more detail.

An equipment model describes metadata for interpreting semantics of a device or a piece of equipment. In other words, the equipment model describes properties of the device that it models, and it is a kind of virtual equipment type, or type definitions, to provide specific desired functionality. The term "equipment" or "equipment instance" means herein a virtual representation of a Thing. An equipment instance contains actual property values of properties of a Thing, while the equipment model describes the information model and metadata of the properties. There may be different equipment models for different hierarchy levels. The equipment model may comprise for each property in the model definitions, such as description, unit, aggregation rules and the data collection protocol with sampling rules. For example, an equipment model may comprise the following definitions:

Name of the model
Link to owner of the model and other documentation
Version number of the model
Possible inheritance from another model Property definitions that may contain for each property: data type of the property (float, integer, text, array of something, etc.), scalar or time series, unit, value range, type of histories to be collected (storage, aggregation rules, such as time averages, standard min/max, operating time, etc.), data acquisition definitions (protocol, item id, collection cycles, etc.), alarming limits. Further, the property definitions may contain rules or definitions how to map local data in a device/node to the model properties. An example of mapping definitions includes defining from which variable, register, or memory location the data in the device is read to a particular property value and how frequently.

Function definitions that describe which kind of functions the device can perform Interface definitions for exposing model-specific application programming interfaces (APIs)

List of TCP/IP tunnels to target services available from the device (for example a remote desktop service within the device itself or in another connected device)

In addition to equipment models on Things, there may be one or more equipment models for gateways. An equipment model for a gateway may comprise, for example, both an internal configuration and security configuration for gateway operations. However, part or all of the security configurations may be given in separate equipment models, for example in equipment models for firewalls or in equipment models for ports. Internal configuration may comprise definitions defining what data on internal telemetry operations to provide, what to report, when to report and different alarm limits for alarms (that are a specific type of notifications). A common security definition for gateways may be an internal secure communication protocol used in gateway-to-gateway communications.

The model definitions for equipment models 111-1 may be according to ISA-95 type equipment model definitions, for example. ISA-95 is an ISO standard defining, among other things, standard terminology and information models, which may be used to define equipment models. It should be appreciated that any other model definitions for information models may be used as well.

In conclusion, the equipment model may define semantics for the data, control the device data recording, provide a basis for analytics and applications, as well as a basis for visualization, without detailed information on the actual device instances or signal names, and provide an integrated security model. The equipment model may thereby provide tools for common information modelling with cyber security that is centrally engineered and applied uniformly. Consequently, data from heterogeneous data sources may be combined in a structured manner.

Although not illustrated in FIG. 1, in addition to or included in the equipment models, also rules for data flows may be defined. The rules may be called data flow rules, data transfer rules, or communication rules, for example. A data flow rule may define what data is to be sent from the gateway, possibly also when to send the data. A data flow rule may also define what kind of data will be received and/or how the data is to be converted, if conversion is needed, for example because of different equipment model definitions in use. It should be appreciated that the data flow rules may be for data flows within the system, whereas notifications or different outputs on user interfaces, etc., may not be within the definitions of data flow rules. However, herein such a distinction is not made, and below reporting may cover, in addition to notifications or other information a user has subscribed, sending data according to one more data flow rules, regardless of whether the rules are part of the equipment model or separate from the equipment model.

Furthermore, in the illustrated embodiment, one or more user devices 114 are connected to the global cloud 101'. The user device may be used, for example, by a service technician (with proper access rights) to provide remote maintenance services to different enterprises, for example to install software updates to the one or more devices 141, 141' at the device level 104. A non-limiting list of examples for the user device 114 includes a laptop, workstation, smartphone, mobile phone, or tablet. In the illustrated embodiment, the user device comprises a tunnel client unit 114-1, herein referred to as tunnel client, for remotely connecting to devices 141, 141', or more precisely, to target service units 141-2, 141'-2 (for example a remote desktop service), herein referred to as target service. The tunnel client 114-1 may comprise a graphical user interface or command-line interface, for example. Furthermore, in the illustrated embodiment, device 141 and device-level gateway 140 may comprise a role-based access control (RBAC) component as part of the tunnel service 140-1, 141-1 for controlling access to a target service 141-2, 141'-2. Alternatively, the global cloud 101' may comprise an RBAC service for controlling access to the target services. RBAC is a user authorization mechanism that may be provided by a cloud computing platform to provide granular access controls to the system based on the associated roles of the users in an organization/enterprise. It should be appreciated that, although not depicted in FIG. 1, at each level a user may also connect directly to a gateway (if the gateway accepts connections from the Internet) by means of his/her user device in order to connect to a target service or to study, process, etc. data on the desired level, on a prerequisite that the user has the required access rights.

The enterprise level 102 may comprise one or more enterprise level clouds 102' that in turn may comprise one or more gateways 120 (computing nodes). The gateway 120 at the enterprise level may provide an enterprise-wide service platform for applications, including equipment models and instances, data collection, enterprise analytics, and other application runtimes, for example. The gateway 120 on the enterprise level may comprise an intermediate tunnel service unit 120-1 for relaying TCP/IP tunnels between the cloud-level tunnel service 113-1 and the tunnel services 130'-1, 130"-1, 130'''-1 on the plant level 103. A user may also connect directly to the enterprise-level gateway 120, or more specifically, to its tunnel service 120-1, for establishing a tunnel to a target service 141-2, 141'-2. In other words, the enterprise-level tunnel service 120-1 may also be used to provide the same functionality as the tunnel service 113-1 in the global cloud.

The plant level 103 may comprise a plurality of gateways 130, 130', 130", 130''' (computing nodes). The gateways 130, 130', 130", 130''' at the plant level may provide a plant-wide service platform for applications including equipment models and instances, data collection, plant analytics, and other application runtimes, for example. The plant level may be implemented by use of one or more clouds, virtual machines, and/or physical computers. As can be seen in FIG. 1, the gateways 130, 130', 130", 130''' at the plant level may be connected to the global cloud 101' directly or via one or more gateways 120 at the enterprise level. Each of the plant-level gateways 130, 130', 130", 130''' may comprise an intermediate tunnel service unit 130-1, 130'-1, 130"-1, 130'''-1 for relaying TCP/IP tunnels between the enterprise-level tunnel service 120-1 and the tunnel services 140-1, 141-1 on the device level 104, if directly connected thereto.

The device level 104 may comprise, in addition to a plurality of devices 141, 141', one or more gateways 140 (computing nodes), whereto devices 141' may be connected. The gateways 140 at the device level may provide a device, a system, or a production line wide service platform for applications including equipment models and instances, data collection, analytics, and other application runtimes, for example. Although not illustrated in FIG. 1, the gateways 140 at the device level 104 may be connected to the global cloud directly, or via one or more gateways at the enterprise level 102, or via one or more gateways at the plant level 103, or, as illustrated in FIG. 1, via a chain or chains of gateways at the plant level and enterprise level. It should be appreciated that although illustrated only in the device-level gateway 140, a gateway at any level may send data (transfer data) to a plurality of gateways (two, three, four, etc.) at higher levels. For example, one gateway may send data to gateways that represent different functional purposes, for example one for asset monitoring and production tracking, one for energy management and one for gateway monitoring. Each of the device-level gateways 140 may also comprise a tunnel service unit 140-1 for relaying TCP/IP tunnels between the plant-level tunnel services 130'-1, 130"-1, 130"'-1 and the target services 141'-2 (for example a remote desktop service) in the target devices 141'. As illustrated in FIG. 1, a target device 141 at the device level 104 may also comprise gateway functionality and a tunnel service 141-1 in the device itself, in order to connect to a plant-level gateway 130' without a separate device-level gateway in between.

In FIG. 1, the devices 141, 141' may represent Things that the Industrial Internet of Things comprises. The Things may be different devices, machines, apparatuses, equipment, systems, sub-systems, processes, etc. A few examples of Things include a pump, motor, valve, industrial PC, production line and a control loop. There are no restrictions on what constitutes a Thing. It suffices that the Thing comprises means for performing one or more different measurements on environment and/or one or more operations, for example, and means for sending the information at least to one or more gateways. Further, a Thing may itself comprise Things that the analytics sees as one combined Thing. The implementation of the Industrial Internet of Things, data collected therefrom and means used for information exchange bear no significance to the invention, and therefore they are not described in more detail here. It is obvious for one skilled in the art that any known or future solution may be used.

In FIG. 1, a gateway is a computing device (node) configured at least to send and/or receive data, either as a standalone device or embedded in an existing device. Depending on the gateway and its use, the gateway may be a small electrical device, a mobile device, a laptop, a personal computer, a server, an edge computing device, a virtual machine, or a cloud function, just to mention some examples. Naturally, the gateway may include a data storage and/or one or more user interfaces.

For securing the IIoT system, in the illustrated embodiment there may be one or more firewalls (FW) between gateways, and the gateways may be configured to communicate with each other using a secure communication protocol. Hence, an end-to-end security may be provided through an intermediate system (with a corresponding middleware), enabling secure communication between different gateways. In the embodiment, data traffic from a gateway to a northbound node, for example a node at an upper level, may use an outbound port, such as port 80 or 443 in the gateway. The firewalls may be configured to not allow connections to southbound nodes, for example a gateway at a lower level, as depicted by directions indicated by the arrow ends of the connections in FIG. 1. More precisely, the gateway 140 and device 141 at the device level 104 may be connected via firewalls 154, 154', 154" to gateways at the upper level, but the gateway 140 and device 141 may not be directly connected to the cloud, and thus they may have no direct IP connectivity to the user device 114. Furthermore, gateways 130, 130', 130", 130"' at the plant level may in turn be connected via firewalls 153, 153', 153", 153"' to gateways at the upper level, or to the cloud if directly connected thereto, and gateways 120 at the enterprise level may be connected via firewalls 152 to the cloud. This may result in a situation in which an outbound connection from a node in an industrial plant to the cloud is possible, but not an inbound connection from the cloud to a node in the industrial plant. However, all the connections may be bidirectional so that when a node establishes an outbound connection via an outbound port to its northbound neighbour, for example a node at an upper level, the connection is also established backwards. This may be referred to as a reverse connection. For example, the device 141 at the device level may establish an outbound connection from the device 141 to the cloud-level gateway 113 via an outbound port in the device 141 and in the intermediate gateways on the path to the cloud-level gateway 113, and the cloud-level gateway 113 may then use that pre-established active connection to establish a reverse connection from the cloud-level gateway 113 to the device 141 in order to enable bidirectional communication between the cloud-level gateway 113 and the device 141. In such an environment, the connected nodes' information may comprise only the northbound nodes to which an outbound connection can be established. Further, the data flow rules may be bidirectional and comprise a definition to which direction the data may be transferred, for example from the southbound node to the northbound node or to the other direction. The individual connections between individual nodes may together form a chain of trusted point-to-point connections (for example secure WebSocket connections) with certificate-based mutual authentication between the nodes in the system, and the cloud-level gateway 113 may be configured to have trusted bidirectional communication with the one or more target devices 141, 141' via this chain. To be specific, herein a point-to-point connection means a connection between a pair of neighbouring nodes/gateways (for example between gateway 140 and gateway 130'). For example, the transport layer security (TLS) protocol and X.509 public key infrastructure (PKI) may be used for creating the chain of trust and secure communication in the system. In addition, a root certificate may be used to create certificates for the target devices 141, 141', and the user device 114 may be configured to trust the root certificate by default. Therefore, the user device may automatically trust the target device certificates as well. The TLS protocol as well as X.509 PKI and the ways to create certificate chains are well known by persons skilled in the art, and hence not described in detail herein.

It should be appreciated that there may also be other firewalls than those depicted in FIG. 1.

Although not illustrated in FIG. 1, the connections may be over one or more networks, which may be of the same type or a different type. The type of network and protocols used bear no significance to the invention and therefore are not described in more detail herein.

As said earlier, the above illustrated hierarchy depicts only one embodiment. In another embodiment, at the device level there may be a gateway connected to a plurality of devices and to one or more gateways that in turn are connected to a plurality of devices. Further, gateways on the same level may be connected to each other. The hierarchical structure may enable central management of equipment models and data flow rules including their distribution within the gateway, wherein they may be pushed from the cloud downwards in the hierarchy and thereby may be applied by all gateways (computing nodes). However, the equipment models do not have to be the same in each gateway, and the data flow rules may provide a tool to enable conversions between the equipment models as well as between different data types.

In conclusion, FIG. 1 illustrates an IIoT platform architecture that may provide connectivity and drill-down data access through the levels to required details irrespective of the actual data storage. Further, the IIoT platform architecture may provide means for integrated management and control of essential resources from the device level 104 up to the global cloud 101', including security and the devices comprising the IIoT platform. The main information flow directions are from the global cloud level to lower levels (from top to bottom) and from device level to upper levels (from bottom to top). It should be appreciated that actual system topologies, integrations with external systems, etc. may differ based on industry requirements, and products, for example.

Figure 2:
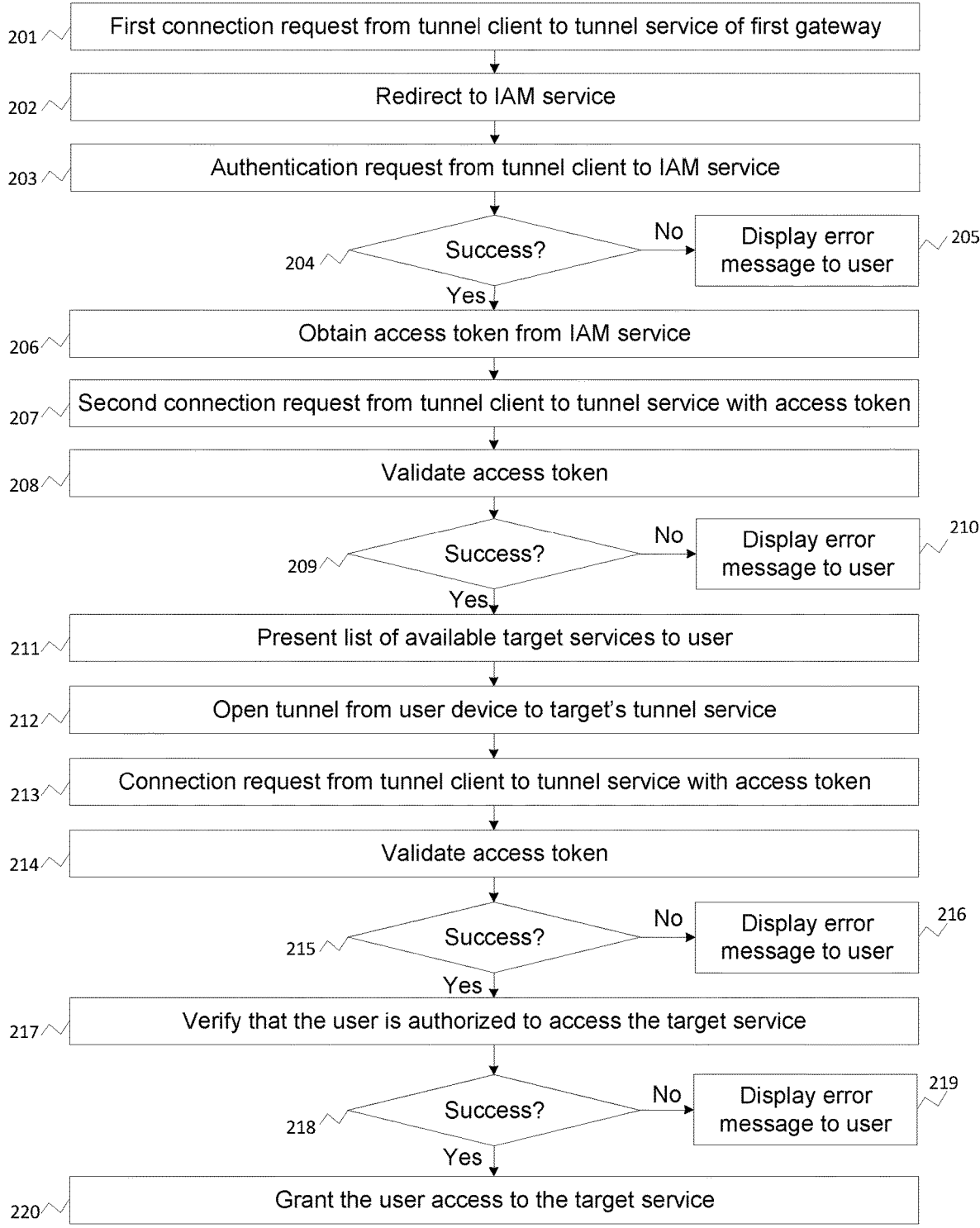
FIGS. 2 and 3 are flow charts illustrating exemplary functionalities.

FIG. 2 illustrates the software-enabled functionalities of an embodiment of the invention. In step 201, a connection request is sent from a tunnel client application running on a user device to a tunnel service running on a first gateway in the global cloud (or on an enterprise-level gateway).

In step 202, the first gateway's tunnel service then sends to the tunnel client application a redirect request to an identity and access management (IAM) service for authenticating the user and for obtaining an SAML access token for the user. It should be appreciated that other authentication protocols and token formats may also be used. In step 203, the tunnel client application sends an authentication request to the IAM service, and the user logs in for example with his/her federated identity (i.e. username and password).

In case authentication was not successful (step 204: no), a suitable error message is displayed to the user in step 205 and the process will not continue further. In case of success (step 204: yes), the IAM service sends a user-specific access token to the tunnel client application in step 206.

In step 207, the tunnel client application then sends to the first gateway's tunnel service a second connection request containing the user's access token. Then, in step 208, the first gateway's tunnel service sends the user's access token to the IAM service for validation.

In case the validation was not successful (step 209: no), a suitable error message is displayed to the user in step 210 and the process will not continue further. If the access token is validated successfully (step 209: yes), in step 211 the tunnel client application then sends a query to the first gateway's tunnel service for a list of target services (for example a remote desktop service) in target devices at the lower levels (for example at the device level), which are assigned to be available for the role(s) associated with the user in the organization/enterprise. In another embodiment, the list may comprise available target devices instead of target services. Upon receiving the list, the tunnel client application presents the list to the user in a graphical user interface of the tunnel client application (or in a command-line interface, for example).

In step 212, the user then selects from this list an available target service to attempt to connect to, and the first gateway's tunnel service communicates with the tunnel services in the other gateways on the path to the target service, in order to open an end-to-end tunnel, for example a TCP/IP tunnel with TLS encryption, between the user device and the tunnel service controlling access to the selected target service (i.e. a tunnel service in the same target device as the selected target service, or a tunnel service in another device/gateway that is directly connected to the target device containing the target service). This tunnel is relayed via a chain of trusted certificate-based point-to-point connections, for example secure WebSocket connections, through the intermediate gateways between the user device and the target's tunnel service (i.e. the tunnel service controlling access to the selected target service as mentioned before). Even though each of these intermediate point-to-point connections is individually encrypted as such, the end-to-end tunnel itself is also encrypted separately with TLS in order to achieve end-to-end encryption. It should be noted that the tunnel is not established by any one gateway alone, as each of the intermediate gateways in the chain/path may also comprise its own tunnel service that may all work together with the first gateway's tunnel service and the target's tunnel service for opening the tunnel. In other words, all of the tunnel services in the chain/path may comprise functionalities that may be orchestrated to work together in establishing the end-to-end tunnel.

In step 213, the tunnel client application uses the tunnel opened in step 212 to send a connection request containing the user's access token to the target's tunnel service. Before granting the user access to the target service, in step 214 another end-to-end tunnel, for example a TCP/IP tunnel with TLS encryption, is opened between the target's tunnel service and the IAM service by relaying the tunnel via a chain of trusted certificate-based point-to-point connections through the intermediate gateways between the target's tunnel service and the IAM service. As in step 212, this tunnel may also be established by all of the tunnel services in the chain/path working together. The target's tunnel service then sends the user's access token via the tunnel to the IAM service for validation.

In case the validation was not successful (step 215: no), a suitable error message is displayed to the user in step 216 and the user is denied access to the target service. If the access token is validated successfully (step 215: yes), in step 217 the target's tunnel service checks whether the user is authorized to access the target service based on the role(s) associated with the user for example with RBAC or some other authorization method. In case the authorization was not successful (step 218: no), a suitable error message is displayed to the user in step 219 and the user is denied access to the target service. If the authorization is successful (step 218: yes), in step 220 the user is granted access to the target service by the target's tunnel service and an end-to-end connection is established between the user device and the target service via the tunnel between the target's tunnel service and the user device. The user may then communicate with the target service, for example a remote desktop service, in the target device for example to control it remotely.

However, depending on how the target service itself is configured, the target service may also apply further actions for authenticating the user before granting access to it, for example by requiring a username and password, or by using the tunnel from the target's tunnel service to the IAM service for re-validating the user's access token. In this case, the target service may request the user's access token from the user device separately. If the target service receives a connection request comprising the user's access token, the target service may then send the access token to the IAM service for validating the access token (for a third time) before granting the user access to the target service.

The steps and related functions described above in FIG. 2 are in no absolute chronological order, and some of the steps may be performed simultaneously or in an order differing from the given one. Other functions can also be executed between the steps or within the steps, and other information may be sent. Some of the steps or part of the steps may also be left out or replaced by a corresponding step or part of the step. For example, if the user device has previously already obtained an access token, it may already be included in the first connection request of step 201, in which case the process would continue directly to step 208.

A particular problem with traditional remote-access methods is user authentication, as the user authentication in legacy systems may typically require the user to know the specific access credentials of each individual device in order to connect to it. It is time-consuming for a service technician to manage all of the separate credentials for potentially thousands of industrial devices, as well as for the device management to manage all the user accounts of potentially hundreds of service technicians, especially when the user roles are continuously changing. Such legacy authentication systems might also lead to compromises in corporate security policies due to this complexity. For example, in a legacy system, a disgruntled ex-employee might still be able to use his/her user credentials to cause damage or harm to the system after his/her employment has already ended. Therefore, a particular benefit of some embodiments may be that they may be used to add an additional layer of authentication for accessing the target service. Or, if the tunnel is the only way to access the target service remotely and all other ports are disabled from it, then some embodiments may alternatively be used to replace the existing authentication protocol used by the target service, for example by replacing device-specific usernames and passwords with authentication using federated identity and authorization with RBAC.

The tunnel between the user device and the target service may be used to forward any TCP/IP connection in either direction between the user device and the target service (for example, a remote desktop connection from the target service to the user device may also be possible), as long as the user is authenticated and the target service is configured to allow this connection for that particular user. For example, the target service may therefore also use the tunnel to fetch software updates from a software repository on the user device's network. Another benefit of some embodiments may be that they may not require as complex setup configurations for establishing remote connections as traditional remote access methods may do. Furthermore, some embodiments may enable remote access by hierarchical tunneling through multiple network levels by using only existing (legacy) network infrastructure, so that there is no need to install any separate remote-access gateways to the system, for example. Although there may be multiple intermediate hops through the various network levels, the connection may be established with end-to-end encryption between the target's tunnel service and the user device in order to prevent mid-nodes from establishing a man-in-the-middle attack even in case they are compromised. In other words, if some node is compromised, the point-to-point connections from that node may be disconnected, and as a result the end-to-end tunnel therefore also gets disconnected. The tunnel may also be automatically disconnected when the user's access token expires.

Figure 3:
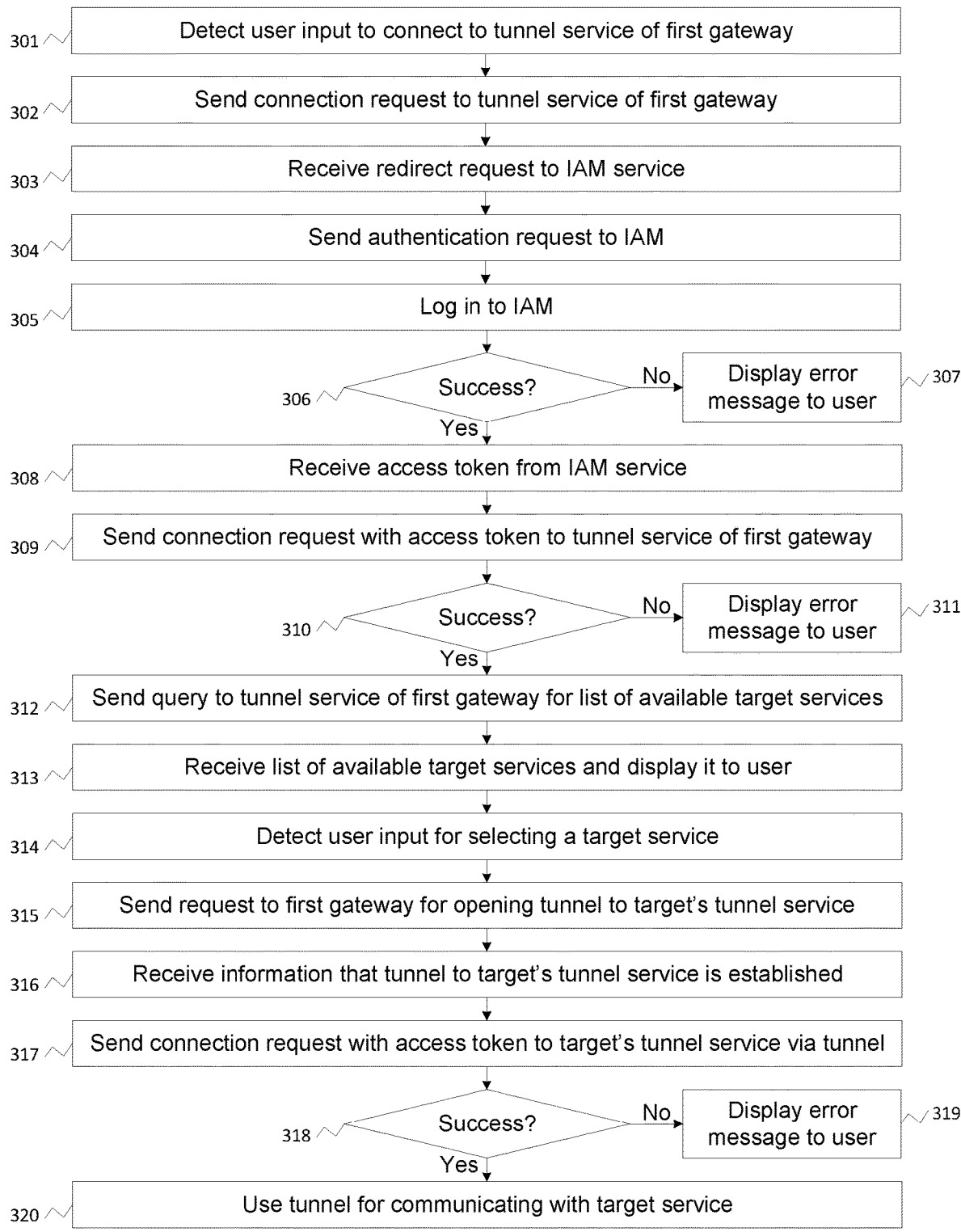

FIG. 3 illustrates the software-enabled functionalities of an embodiment of the invention from the perspective of a user device comprising a tunnel client application. In step 301, the tunnel client application detects via a graphical user interface (or command-line interface) a user input requesting a connection to a tunnel service running on a first gateway in the global cloud (or on an enterprise-level gateway). In step 302, the tunnel client application then sends a corresponding connection request to the tunnel service running on the first gateway.

In step 303, the tunnel client application receives from the first gateway's tunnel service a redirect request to an identity and access management (IAM) service for authenticating the user and for obtaining an SAML access token for the user. In step 304, the tunnel client application sends this connection request to the IAM service, and in step 305 the user is asked to log in to the IAM service, for example in a web browser window by using a user-specific federated identity. In case the login was not successful (step 306: no), in step 307 a suitable error message is displayed to the user by the tunnel client application and the process will not continue further, or the user can be asked to retry the login. In case of success (step 306: yes), in step 308 the tunnel client application receives the user's user-specific access token from the IAM service.

In step 309, the tunnel client application then sends to the first gateway's tunnel service a second connection request containing the user's access token. Then, in step 310, the tunnel client application receives a reply from the first gateway's tunnel service on whether the connection was successful. In case the connection was not successful (step 310: no), in step 311 a suitable error message is displayed to the user by the tunnel client application and the process will not continue further. If the connection was successful (step 310: yes), in step 312 the tunnel client application then sends a query to the first gateway's tunnel service for obtaining a list of target services (for example a remote desktop service), which are assigned to be available for the role(s) associated with the user in the organization/enterprise. In step 313, the tunnel client application receives this list and presents it to the user in a graphical user interface of the tunnel client application (or in a command-line interface, for example).

In step 314, the tunnel client application then detects a user input requesting a connection to a target service specified by the user, and in step 315 the tunnel client application sends a request to the first gateway's tunnel service for establishing a tunnel between the user device and the tunnel service controlling access to the selected target service (i.e. a tunnel service in the same target device as the selected target service, or a tunnel service in another device/gateway that is directly connected to the target device containing the target service). In step 316, the tunnel client application receives information that the tunnel is established, and in step 317 the tunnel client application sends a connection request containing the user's access token to the target's tunnel service (i.e. the tunnel service controlling access to the selected target service).

Then, in step 318, the tunnel client application receives a reply from the target's tunnel service on whether the connection was successful. In case the connection was not successful (step 318: no), in step 319 a suitable error message is displayed to the user by the tunnel client application and the process will not continue further. If the connection was successful (step 318: yes), in step 320 the user device can use the tunnel created between the user device and the target's tunnel service in order to communicate with the target service.

The steps and related functions described above in FIG. 3 are in no absolute chronological order, and some of the steps may be performed simultaneously or in an order differing from the given one. Other functions can also be executed between the steps or within the steps, and other information may be sent. Some of the steps or part of the steps can also be left out or replaced by a corresponding step or part of the step.

Figure 4:
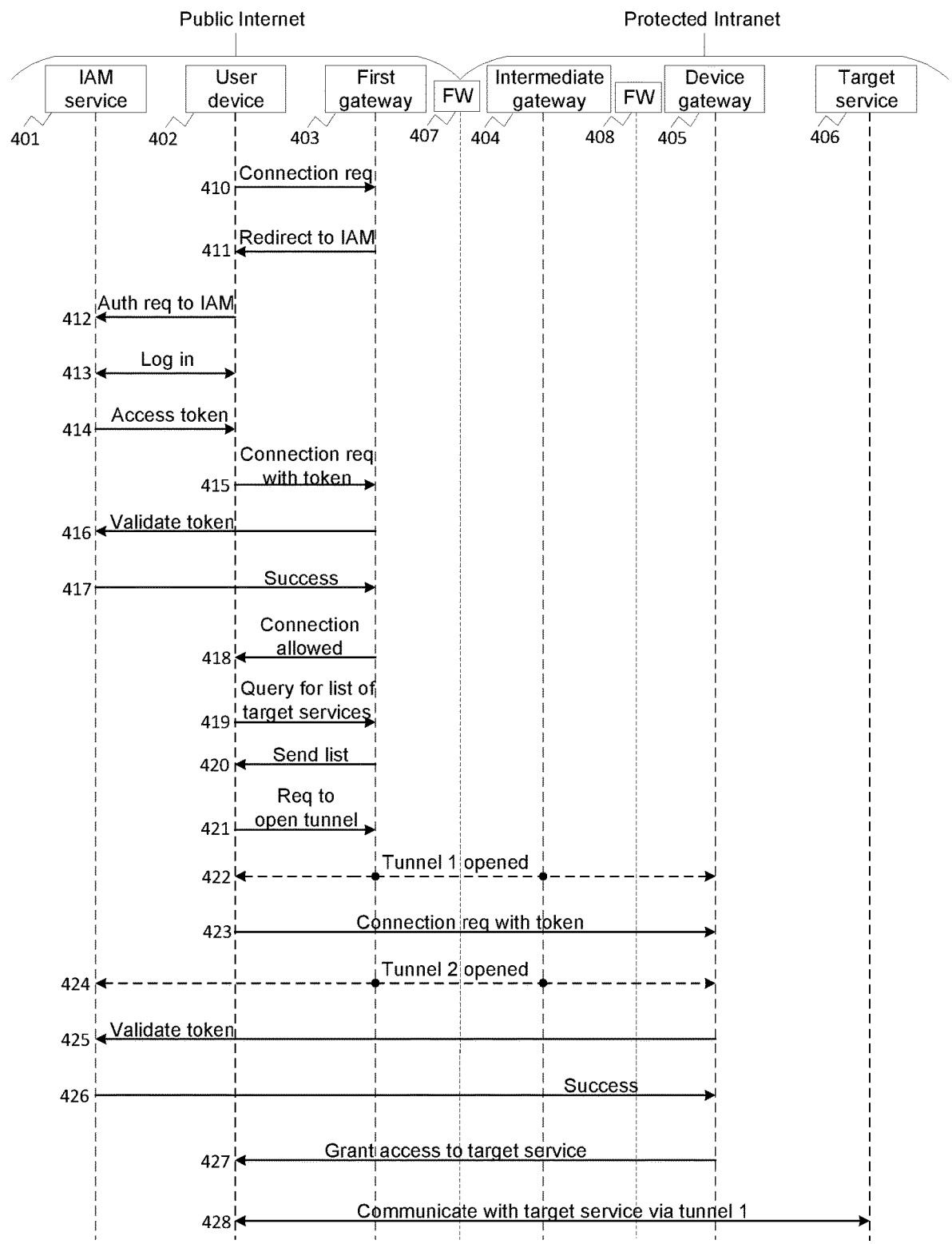
FIG. 4 illustrates information exchange.

FIG. 4 illustrates basic functionalities of an embodiment of the invention as a simplified swimlane diagram. The embodiment comprises an IAM service 401, a user device 402 comprising a tunnel client application, a first gateway 403 comprising a tunnel service, one or more intermediate gateways 404 comprising a tunnel service, one or more device gateways 405 comprising a tunnel service, and one or more target services 406. A device gateway 405 is a gateway that is directly connected to one or more target devices comprising one or more target services 406 (for example a remote desktop service). Alternatively, a device gateway 405 can also be a target device comprising gateway functionalities in itself, in which case the target service 406 would be inside the device gateway 405. In the illustrated embodiment, the IAM service 401, user device 402, and first gateway 403 are all on the public Internet, whereas intermediate gateway 404, device gateway 405 and target service 406 are on a protected intranet network separated from the public Internet by a firewall (FW) 407. There is also another firewall 408 within the intranet network between the intermediate gateway 404 and device gateway 405. In the embodiment, there is a trusted certificate-based connection, for example a secure WebSocket connection, between the device gateway 405 and intermediate gateway 404, as well as between the intermediate gateway 404 and first gateway 403. These connections may use an outbound port (for example port 80 or 443) in the device gateway and in the intermediate gateway.

In point 410, a connection request is sent from the user device to the first gateway. In point 411, the first gateway detects no access token in the connection request, and sends to the user device a redirect request to the IAM service for authenticating the user and for obtaining an SAML access token for the user. In point 412, the user device sends an authentication request to the IAM service, and in point 413 the user logs in with his/her federated identity (i.e. username and password), for example. Upon successful login, in point 414 the IAM service sends a user-specific access token to the user device.

In point 415, the user device then sends to the first gateway a second connection request containing the user's access token. Then, in point 416, the first gateway sends the user's access token to the IAM service for validation. Upon successful validation, in point 417 the IAM service sends to the first gateway a reply stating that the validation was successful. Then, in point 418, the first gateway allows the connection and sends a reply to the user device stating that the connection request was successful.

In point 419, the user device sends to the first gateway a query for a list of target services (for example a remote desktop service), which are assigned to be available for the role(s) associated with the user in the organization/enterprise, and in point 420 the first gateway sends this list to the user device as a reply. In point 421, the user device sends to the first gateway a request for opening a tunnel to the device gateway controlling access to the target service, which the user would like to connect to.

In point 422, the user device, the first gateway, the intermediate gateway and the device gateway communicate with each other for establishing an end-to-end tunnel, for example a TCP/IP tunnel with TLS encryption, between the user device and the device gateway. This tunnel is relayed via a chain of trusted point-to-point connections, for example secure WebSocket connections, through the intermediate gateway and the first gateway between the user device and the device gateway. Even though each of these intermediate point-to-point connections is individually encrypted as such, the end-to-end tunnel itself is also encrypted separately with TLS in order to achieve end-to-end encryption.

In point 423, the user device sends to the device gateway (via the tunnel) a connection request containing the user's access token for requesting access to the target service. Before granting the user device access to the target service, in point 424 a second encrypted end-to-end tunnel, for example a TCP/IP tunnel with TLS encryption, is opened between the device gateway and the IAM service by relaying the tunnel via the intermediate gateways(s) and the first gateway between the device gateway and the IAM service.

In point 425, the device gateway then sends the user's access token via the second tunnel to the IAM service for validation. Upon successful validation, in point 426 the IAM service sends to the device gateway a reply stating that the validation was successful. Then, in point 427, the device gateway sends a reply to the user device stating that the connection request was successful and that the user device is now allowed to communicate with the target service. Finally, in point 428 the user device can use the first tunnel to communicate with the target service.

Figure 5:
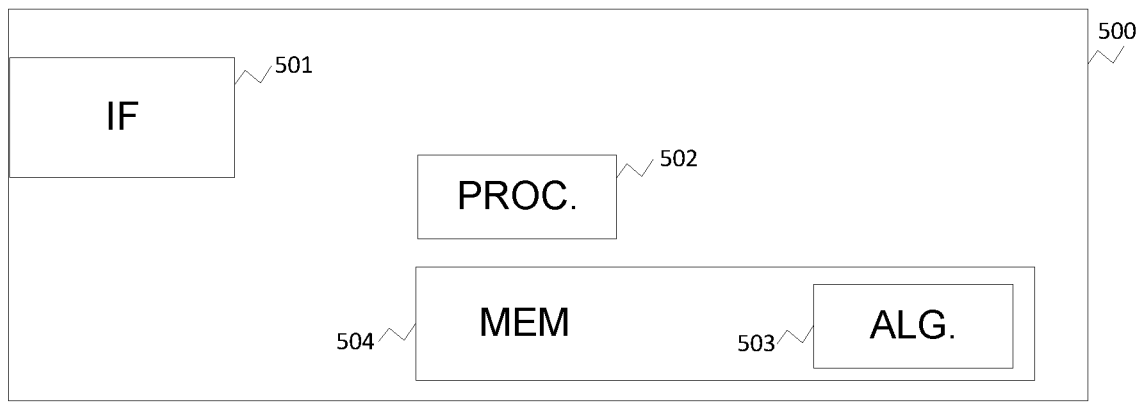
FIG. 5 is a schematic block diagram.

FIG. 5 is a simplified block diagram illustrating some units for a device (an apparatus) 500, such as a user device, a device-level device, a gateway for IIoT, or a corresponding computing device. In the illustrated example, the device comprises one or more interfaces (IF) 501 for receiving and/or retrieving and/or transmitting information from or to other devices, and possibly from or to a user, a processor 502, algorithms 503 corresponding with one or more functionalities described above with FIGS. 1 to 4, and memory 504 usable for storing a computer program code required for the algorithms for implementing the functionalities. The memory 504 is also usable for storing other possible information, such as configurations, lists, data flow rules, equipment models, telemetry data, firewall data, etc.

In other words, a device (apparatus) configured to provide one or more functionalities described above with FIGS. 1 to 4, is a computing device that may be any apparatus or device or equipment or node configured to perform one or more of corresponding device functionalities described with an embodiment/example/implementation, and it may be configured to perform functionalities from different embodiments/examples/implementations.

The device/apparatus may comprise a processor, controller, control unit, micro-controller, or the like, connected to a memory and to various interfaces of the apparatus. The processor may be a central processing unit, or the processor may be an additional operation processor. Each or some or one of the units/sub-units and/or algorithms described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units/sub-units and/or algorithms described above may comprise one or more computer processors, application-specific integrated circuits (ASIC), digital signal processors (DSP), digital signal processing devices (DSPD), programmable logic devices (PLD), field-programmable gate arrays (FPGA), logic gates and/or other hardware components that have been programmed and/or will be programmed by downloading computer program code (one or more algorithms) in such a way to carry out one or more functions of one or more embodiments/implementations/examples. An embodiment provides a computer program embodied on any client-readable distribution/data storage medium or memory unit(s) or article(s) of manufacture, comprising program instructions executable by one or more processors/computers, which instructions, when loaded into a device, constitute one or more functionalities described above with FIGS. 1 to 4. Programs, also called program products, including software routines, program snippets constituting "program libraries", applets and macros, can be stored in any medium and may be downloaded into an apparatus. In other words, each or some or one of the units/sub-units and/or the algorithms described above may be an element that comprises one or more arithmetic logic units, a number of special registers and control circuits.

Further, the device/apparatus configured to provide the gateway for IIoT, or a device configured to provide one or more corresponding functionalities described above with FIGS. 1 to 4, may comprise volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. In other words, the memory, or part of it, may be any computer-usable non-transitory medium within the processor/apparatus or external to the processor/apparatus, in which case it can be communicatively coupled to the processor/apparatus via various means as is known in the art. Examples of an external memory include a removable memory detachably connected to the apparatus, a distributed database and a cloud server. The memory may also store computer program code such as software applications (for example, for one or more of the units/sub-units/algorithms) or operating systems, information, data, content, or the like for the processor to perform steps associated with operation of the apparatus in accordance with examples/embodiments.

It will be obvious to a person skilled in the art that, as technology advances, the inventive concept can be implemented in various ways. The invention and its embodiments are not limited to the examples described above but may vary within the scope of the claims.

The invention claimed is:

1. A computer-implemented method comprising:
   receiving, by a first gateway, a first connection request from a user device, said first connection request including an access token;
   validating the access token in an identity and access management (IAM) service;
   after successful validation, establishing a first tunnel between the user device and a target device via a chain of trusted certificate-based point-to-point connections through one or more intermediate gateways, wherein the first tunnel is established by using a reverse connection from the first gateway to the target device, said reverse connection being based on a pre-established connection from the target device to the first gateway via an outbound port in the target device and in each of the one or more intermediate gateways in the chain, said target device having no direct internet protocol connectivity to the user device without the first tunnel;
   receiving, by the target device, a second connection request from the user device via the first tunnel, said second connection request including the access token;
   establishing a second tunnel between the target device and the IAM service via the chain of trusted certificate-based point-to-point connections through the one or more intermediate gateways, wherein the second tunnel is established by using the reverse connection from the first gateway to the target device, said target device having no direct internet protocol connectivity to the IAM service without the second tunnel;
   validating the access token in the IAM service via the second tunnel;
   verifying, by the target device, that a user is authorized to access a target service, said target service being included in the target device or in another device directly connected to the target device; and
   upon successful authorization, granting the user device access to communicate with the target service via the first tunnel.

2. The computer-implemented method of claim 1, wherein X.509 public key infrastructure is used to create the chain of trusted certificate-based point-to-point connections, and a root certificate is used to create a certificate for the target device, wherein the user device is configured to trust the root certificate by default.

3. The computer-implemented method of claim 1, further comprising:
   receiving, by the first gateway, a token-less connection request from the user device;
   redirecting, by the first gateway, the user device to the IAM service;
   authenticating a user of the user device in the IAM service; and
   upon successful authentication, receiving, by the user device, the access token from the IAM service;
   wherein the first connection request is received, by the first gateway, from the user device, after authenticating the user of the user device in the IAM service.

4. The computer-implemented method of claim 1, further comprising:
   receiving, by the target service, a third connection request from the user device via the first tunnel, said third connection request including the access token; and
   validating the access token in the IAM service via the second tunnel.

5. The computer-implemented method of claim 1, wherein the authorization of the user is based at least on one or more roles associated with the user.

6. A non-transitory computer readable medium comprising program instructions which, when run on a computing apparatus, causes the computing apparatus to perform at least the following steps:
   receiving a first connection request from a user device, said first connection request including an access token;
   validating the access token in an identity and access management (IAM) service;
   after successful validation, establishing a first tunnel between the user device and a target device via a chain of trusted certificate-based point-to-point connections through one or more intermediate gateways, wherein the first tunnel is established by using a reverse connection from the computing apparatus to the target device, said reverse connection being based on a pre-established connection from the target device to the computing apparatus via an outbound port in the target device and in each of the one or more intermediate gateways in the chain, said target device having no direct internet protocol connectivity to the user device without the first tunnel;

establishing a second tunnel between the target device and the IAM service via the chain of trusted certificate-based point-to-point connections through the one or more intermediate gateways, wherein the second tunnel is established by using the reverse connection from the computing apparatus to the target device, said target device having no direct internet protocol connectivity to the IAM service without the second tunnel;

validating the access token in the IAM service via the second tunnel;

verifying, by the target device, that a user is authorized to access a target service, said target service being included in the target device or in another device directly connected to the target device; and upon successful authorization, granting the user device access to communicate with the target service via the first tunnel.

7. Equipment comprising at least one processor and at least one memory including computer program code, wherein the at least one memory and the computer program code are configured to, with the at least one processor, perform the following steps:

receiving a first connection request from a user device, said first connection request including an access token;

validating the access token in an identity and access management (IAM) service;

after successful validation, establishing a first tunnel between the user device and a target device via a chain of trusted certificate-based point-to-point connections through one or more intermediate gateways, wherein the first tunnel is established by using a reverse connection from the equipment to the target device, said reverse connection being based on a pre-established connection from the target device to the equipment via an outbound port in the target device and in each of the one or more intermediate gateways in the chain, said target device having no direct internet protocol connectivity to the user device without the first tunnel;

establishing a second tunnel between the target device and the IAM service via the chain of trusted certificate-based point-to-point connections through the one or more intermediate gateways, wherein the second tunnel is established by using the reverse connection from the equipment to the target device, said target device having no direct internet protocol connectivity to the IAM service without the second tunnel;

validating the access token in the IAM service via the second tunnel;

verifying, by the target device, that a user is authorized to access a target service, said target service being included in the target device or in another device directly connected to the target device; and upon successful authorization, granting the user device access to communicate with the target service via the first tunnel.

8. The equipment of claim 7, wherein the equipment is further caused to perform:

receiving a token-less connection request from the user device;

redirecting the user device to the IAM service; and authenticating a user of the user device in the IAM service;

wherein the first connection request is received from the user device after authenticating the user of the user device in the IAM service.

9. A system comprising at least
a user device,
a target device, and
three or more gateways;

wherein one of the three or more gateways is a first gateway configured to receive a first connection request from the user device, said first connection request including an access token;

wherein one of the three or more gateways is a device gateway directly connected to the target device or included in the target device;

wherein at least one of the three or more gateways is an intermediate gateway between the first gateway and the device gateway;

wherein the first gateway is further configured to have trusted bidirectional communication with the target device via a chain of trusted certificate-based point-to-point connections by using a reverse connection from the first gateway to the target device, said reverse connection being based on a pre-established connection from the target device to the first gateway via an outbound port in the target device and in the intermediate gateway;

wherein the first gateway is further configured to send the access token to an identity and access management (IAM) service for validating the access token;

wherein the three or more gateways are configured to establish a first tunnel between the target device and the user device by using the reverse connection from the first gateway to the target device, said target device having no direct internet protocol connectivity to the user device without the first tunnel;

wherein the target device is further configured to receive a second connection request from the user device via the first tunnel, said second connection request including the access token;

wherein the three or more gateways are further configured to establish a second tunnel between the IAM service and the target device via the chain of trusted certificate-based point-to-point connections by using the reverse connection from the first gateway to the target device, said target device having no direct internet protocol connectivity to the IAM service without the second tunnel;

wherein the target device is further configured to send the access token to the IAM service via the second tunnel for validating the access token;

wherein the target device is further configured to verify that a user associated with the access token is authorized to access a target service, and, upon successful authorization, grant the user device access to communicate with the target service via the first tunnel, said target service being included in the target device or in another device directly connected to the target device.

10. The system of claim 9, wherein the target service is configured to receive a third connection request from the user device via the first tunnel, said third connection request including the access token, and to send the access token to the IAM service via the second tunnel for validating the access token.

11. The system of claim 9, wherein the authorization of the user is based at least on one or more roles associated with the user.

12. The system of claim 9, wherein the first gateway and the IAM service are comprised in a global cloud, and at least one intermediate gateway is connected to the global cloud.

13. The system of claim 9, wherein X.509 public key infrastructure is used to create the chain of trusted certificate-based point-to-point connections.

* * * * *